(12) United States Patent
Vallee et al.

(10) Patent No.: US 10,854,919 B2
(45) Date of Patent: Dec. 1, 2020

(54) BLOCK COPOLYMER ELECTROLYTE FOR LITHIUM BATTERIES

(71) Applicant: Blue Solutions Canada Inc., Boucherville (CA)

(72) Inventors: Alain Vallee, Varennes (CA); Patrick Leblanc, Boucherville (CA); Brieuc Guillerm, Montreal (CA)

(73) Assignee: BLUE SOLUTIONS CANADA INC., Boucherville (CA)

( * ) Notice: Subject to any disclaimer, the term of this patent is extended or adjusted under 35 U.S.C. 154(b) by 203 days.

(21) Appl. No.: 15/821,991

(22) Filed: Nov. 24, 2017

(65) Prior Publication Data

US 2018/0261883 A1    Sep. 13, 2018

Related U.S. Application Data

(60) Provisional application No. 62/469,242, filed on Mar. 9, 2017.

(51) Int. Cl.

| | |
|---|---|
| *H01M 10/0565* | (2010.01) |
| *C08L 101/00* | (2006.01) |
| *H01M 10/052* | (2010.01) |
| *C08G 81/02* | (2006.01) |
| *H01M 4/134* | (2010.01) |
| *H01M 4/38* | (2006.01) |
| *H01M 10/0525* | (2010.01) |
| *H01M 4/02* | (2006.01) |

(52) U.S. Cl.
CPC ...... *H01M 10/0565* (2013.01); *C08G 81/025* (2013.01); *C08L 101/00* (2013.01); *H01M 4/134* (2013.01); *H01M 4/382* (2013.01); *H01M 10/052* (2013.01); *H01M 10/0525* (2013.01); *H01M 2004/027* (2013.01); *H01M 2300/0082* (2013.01)

(58) Field of Classification Search
None
See application file for complete search history.

(56) References Cited

U.S. PATENT DOCUMENTS

| | | | |
|---|---|---|---|
| 6,361,901 | B1 | 3/2002 | Mayes et al. |
| 7,700,241 | B2 | 4/2010 | Best et al. |
| 7,902,299 | B2 | 3/2011 | Kerr et al. |
| 8,445,140 | B2 | 5/2013 | Bertin et al. |
| 9,431,677 | B2 | 8/2016 | Bouchet et al. |
| 2010/0159353 | A1 | 6/2010 | Ohgi et al. |
| 2017/0018801 | A1 | 1/2017 | Grubbs et al. |

FOREIGN PATENT DOCUMENTS

| | | |
|---|---|---|
| CN | 103509153 | 1/2014 |

OTHER PUBLICATIONS

Xue et al., "Poly(ethylene oxide)-based electrolytes for lithium-ion batteries", Journal of Materials Chemistry A, vol. 3 (2015), pp. 19218-19253.

*Primary Examiner* — Daniel S Gatewood
(74) *Attorney, Agent, or Firm* — BCF LLP

(57) ABSTRACT

A solid polymer electrolyte for a battery is disclosed. The solid polymer electrolyte includes solid polymer electrolyte including a diblock copolymer AB or a triblock copolymer of the BAB type, in which block A is an unsubstituted polyethylene oxide chain having a number-average molecular weight less than 80,000 g/mol; block B is an anionic polymer prepared from one or more monomers selected from vinyl monomers and derivatives thereof to which is grafted an anion of lithium salt, and a second monomer having cross-linking functions.

30 Claims, 5 Drawing Sheets

BLOCK COPOLYMER ELECTROLYTE FOR LITHIUM BATTERIES

FIELD OF THE INVENTION

The present invention relates to a solid polymer electrolyte for lithium batteries and more specifically to a cross-linked block copolymer electrolyte which has increased mechanical resistance and improved ionic conductivity.

BACKGROUND OF THE INVENTION

A lithium battery using a lithium metal as a negative electrode has excellent energy density. However, with repeated cycles, such a battery can be subject to dendrites' growths on the surface of the lithium metal electrode when recharging the battery as the lithium ions are unevenly re-plated on the surface of the lithium metal electrode. To minimize the effect of the morphological evolution of the surface of the lithium metal anode including dendrites growth, a lithium metal battery typically uses a pressure system and a solid polymer electrolyte adapted to resist the pressure applied thereto as described in U.S. Pat. No. 6,007,935 which is herein incorporated by reference. Over numerous cycles, the dendrites on the surface of the lithium metal anode may still grow to penetrate the solid polymer electrolyte even though the electrolyte is solid and eventually cause 'soft' short circuits between the negative electrode and the positive electrode, resulting in decreasing or poor performance of the battery. Therefore, the growth of dendrites may still deteriorate the cycling characteristics of the battery and constitutes a major limitation with respect to the optimization of the performances of lithium batteries having a metallic lithium anode.

Various types of polymers have been proposed for solid electrolyte adapted for use with lithium metal electrodes. In particular, the use of polymers consisting of units of ethylene oxide (EO) has been widely known since the end of the 1970s, but it has been found that they do not have sufficient conductivity at room temperature. For example, poly(ethylene oxide) (PEO) of high molecular weight doped with lithium salt has very good mechanical properties at room temperature but is a semicrystalline polymer. The crystalline structure restricts the mobility of the chains and reduces the ionic conductivity of the polymer. Above the inciting point of PEO (Tm 60-65° C.), ionic conductivity increases considerably, but at these temperatures PEO becomes a viscous liquid and loses its dimensional stability.

Research and development of polymer solid electrolytes have been continuously carried out to reinforce the mechanical properties of PEO by adding hard colloidal particles, by increasing the number-average molecular weight of the PEO or by crosslinking, but have generally caused a decrease in ionic conductivity. Efforts have been made to improve the ionic conductivity of PEO by adding plasticizers but those have led to deterioration of the mechanical properties.

More recently, PEO matrix were developed by copolymerization of PEO macromers to produce sequence of block copolymers based on PEO in order to increase the ionic conductivity of the solid polymer electrolyte while maintaining sufficient mechanical properties. Lately, solid polymer electrolytes including a block copolymer with microphase separation comprising an ionic conducting block and a second block not miscible with the ionic conducting block in which an anion is immobilized have been proposed with the aim of eliminating or reducing the use an additional lithium salt while maintaining sufficient ionic conductivity.

For example, U.S. Pat. No. 9,431,677 describes a solid polymer electrolyte consisting of a diblock copolymer of the BA type or a triblock copolymer of the BAB type, in which block A is an unsubstituted polyoxyethylene chain having a number-average molecular weight less than or equal to 100 kDa; block B is an anionic polymer prepared from one or more monomers selected from the vinyl monomers and derivatives thereof, wherein the monomers are substituted with anion of (trifluoromethylsulfonyl)imide (TFSI). The proposed solid polymer electrolyte displays good ionic conductivity but the mechanical properties at temperature above ambient are insufficient to resist the mechanical pressures in the electrochemical cell during operation.

Thus, there is a need for a solid polymer electrolyte including block copolymers which has increased mechanical resistance and improved ionic conductivity which is adapted to reduce or inhibit the effect of the growth of dendrites on the surface of the metallic lithium anode.

STATEMENT OF THE INVENTION

One aspect of the present invention is to provide a solid polymer electrolyte for a battery, the solid polymer electrolyte including a diblock of the AB type or a triblock copolymer of the BAB type, in which block A is an unsubstituted polyethylene oxide chain having a number-average molecular weight less than 80,000 g/mol; block B is an anionic polymer prepared from one or more monomers selected from vinyl monomers and derivatives thereof to which is grafted an anion of lithium salt, and from one or more monomers which are cross-linkable polyfunctional monomers. The cross-linkable polyfunctional monomers having chemical functions R1 and/or R2 that did not participate in the initial polymerization reaction that can be post-reacted for cross-linking. The grafted anions of lithium salt improving the electrochemical performance by increasing the Li ions transport number while the cross-linking functions of the second monomer improving the mechanical strength of the solid polymer electrolyte.

The cross-linkable polyfunctional monomer includes reactive groups for the initial polymerisation reaction, the reactive groups selected from the group consisting of a vinyl phenyl substituted in ortho, meta or para position, an acrylate, a methacrylate, an allyl, an acrylamide, a methacrylamide and a vinyl.

The pendant chemical functions R1 and/or R2 are localized at the end of the B block of the copolymer chain or statistically or block or alternate or gradient distributed in the B block of the copolymer chain, in order to ensure a more efficient and easier multi-dimensional cross-linking and enabling to produce stronger and thinner electrolyte films, for example by thermal means or by ultra violet or electronic radiation.

Another aspect of the present invention is to provide a solid polymer electrolyte for a battery, the solid polymer electrolyte including a diblock of the CD type or a triblock copolymer of the DCD type in which block C is an unsubstituted polyethylene oxide chain having a number-average molecular weight less than 80,000 g/mol; block D is an anionic polymer prepared from one or more monomers selected from vinyl monomers and derivatives thereof to which is grafted an anion of lithium salt, the copolymer chains mixed with a cross-linkable polymer having low molecular weight (<20,000 g/mol) of at least one monomer selected from vinyl phenyl substituted in meta, ortho or para, acrylates and methacrylates, acrylamide, methacrylamide allyl, vinyl and compounds having at least one reactive double bond, the cross-linkable polymer being cross-linked to form a cross-linked copolymer network. The cross-linkable polymer having low molecular weight (<20,000 g/mol) is preferably a polyoxyethylene glycol diacrylate or dimethacrylate.

Another aspect of the invention is to provide a battery having a plurality of electrochemical cells, each electrochemical cell including a metallic lithium anode, a cathode, and a solid polymer electrolyte including a diblock of the BA type or a triblock copolymer of the BAB type, in which block A is an unsubstituted polyethylene oxide chain having a number-average molecular weight less than 80,000 g/mol; block B is an anionic polymer prepared from one or more monomers selected from vinyl monomers and derivatives thereof to which is grafted an anion of lithium salt, and from one or more monomers which are a cross-linkable polyfunctional monomers. The cross-linkable polyfunctional monomer having a chemical function that did not participate in the initial polymerization reaction that can be post-reacted for cross-linking. The grafted anions improving the electrochemical performance by increasing the Li ions transport number while the cross-linking functions of the second monomer improving the mechanical strength of the solid polymer electrolyte to resist growth of dendrites on the surface of the metallic lithium anode.

Another aspect of the invention is to provide a battery having a plurality of electrochemical cells, each electrochemical cell including a metallic lithium anode, a cathode, and a solid polymer electrolyte including a diblock of the CD type or a triblock copolymer of the DCD type in which block C is an unsubstituted polyethylene oxide chain having a number-average molecular weight less than 80,000 g/mol; block D is an anionic polymer prepared from one or more monomers selected from vinyl monomers and derivatives thereof to which is grafted an anion of lithium salt, the copolymer chains mixed with a cross-linkable polymer having low molecular weight (<20,000 g/mol) of at least one monomer selected from vinyl phenyl substituted in meta, ortho or para, acrylates and methacrylates, acrylamide, methacrylamide allyl, vinyl and compounds having at least one reactive double bond, the cross-linkable polymer being cross-linked to form a cross-linked copolymer network improving the mechanical strength of the solid polymer electrolyte to resist growth of dendrites on the surface of the metallic lithium anode.

Embodiments of the present invention each have at least one of the above-mentioned objects and/or aspects, but do not necessarily have all of them. It should be understood that some aspects of the present invention that have resulted from attempting to attain the above-mentioned objects may not satisfy these objects and/or may satisfy other objects not specifically recited herein.

Additional and/or alternative features, aspects and advantages of the embodiments of the present invention will become apparent from the following description, the accompanying drawings and the appended claims.

BRIEF DESCRIPTION OF THE DRAWINGS

For a better understanding of the present invention as well as other aspects and further features thereof, reference is made to the following description which is to be used in conjunction with the accompanying drawings, where.

DESCRIPTION OF PREFERRED EMBODIMENT(S)

Figure 1:
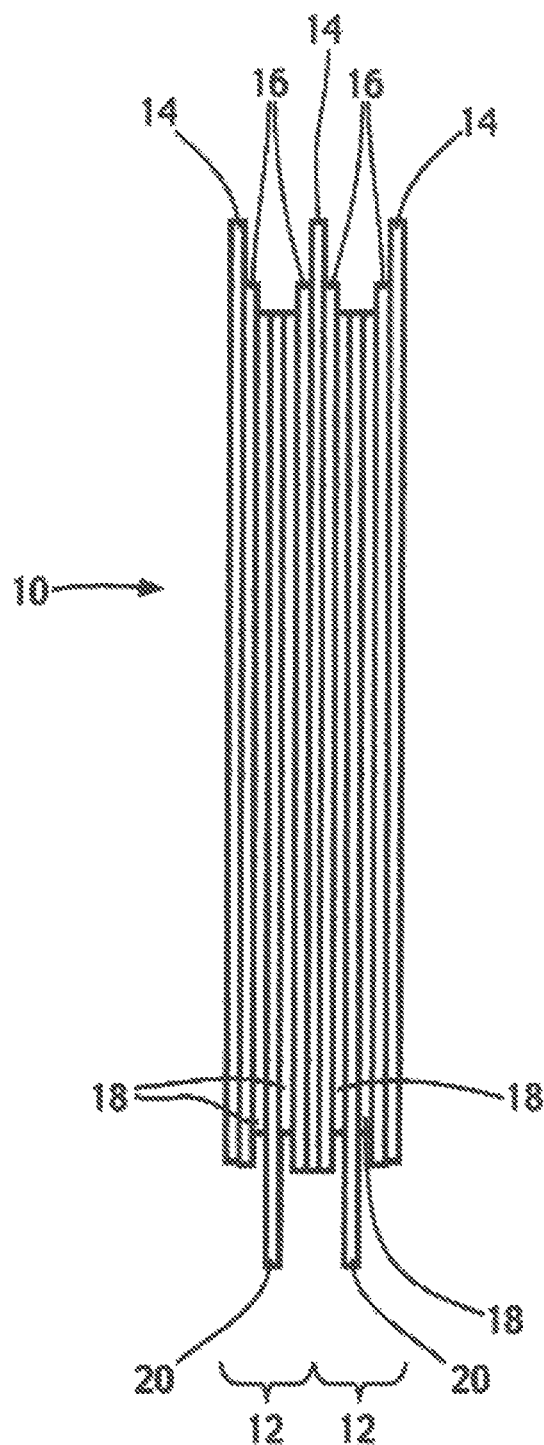
FIG. 1 is a schematic representation of a plurality of electrochemical cells forming a lithium metal polymer battery.

FIG. 1 illustrates schematically a lithium metal polymer battery 10 having a plurality of electrochemical cells 12 each including an anode or negative electrode 14 made of a sheet of metallic lithium, a solid electrolyte 16 and a cathode or positive electrode film 18 layered onto a current collector 20. The solid electrolyte 16 typically includes a lithium salt to provide ionic conduction between the anode 14 and the cathode 18. The sheet of lithium metal typically has a thickness ranging from 20 microns to 100 microns; the solid electrolyte 16 has a thickness ranging from 5 microns to 50 microns, and the positive electrode film 18 typically has a thickness ranging from 20 microns to 100 microns.

The lithium salt may be selected from $LiCF_3SO_3$, $LiB(C_2O_4)_2$, $LiN(CF_3SO_2)_2$, $LiN(FSO_2)_2$, $LiC(CF_3SO_2)_3$, $LiC(CH_3)(CF_3SO_2)_2$, $LiCH(CF_3SO_2)_2$, $LiCH_2(CF_3SO_2)$, $LiC_2F_5SO_3$, $LiN(C_2F_5SO_2)_2$, $LiN(CF_3SO_2)$, $LiB(CF_3SO_2)_2$, $LiPF_6$, $LiSbF_6$, $LiClO_4$, $LiSCN$, $LiAsF_6$, and $LiBF_4$.

The internal operating temperature of the battery 10 in the electrochemical cells 12 is typically between 40° C. and 100° C. Lithium polymer batteries preferably include an internal heating system to bring the electrochemical cells 12 to their optimal operating temperature. The battery 10 may be used indoors or outdoors in a wide temperature range (between −40° C. to +70° C.).

Figure 2:
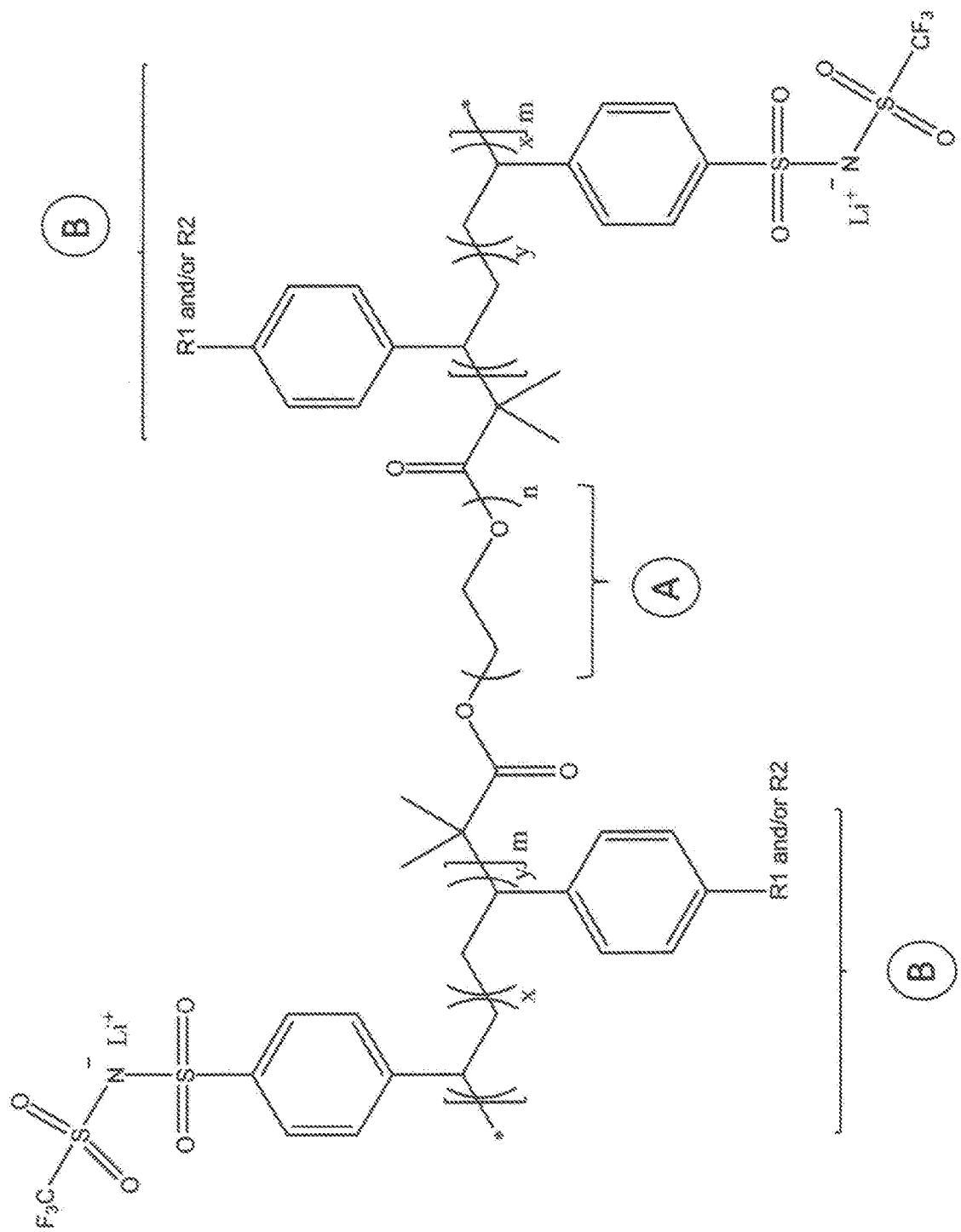
FIG. 2 is schematic representation of a triblock copolymer of the BAB type included in the solid polymer electrolyte in accordance with the invention.

The solid polymer electrolyte 16 according to the invention is composed of a diblock copolymer BA or a triblock copolymer of the BAB type as illustrated in FIG. 2. Block A is an unsubstituted polyethylene oxide chain having a number-average molecular weight preferably less than 80,000 g/mol; block B is an anionic polymer prepared from one or more monomers selected from vinyl monomers and derivatives thereof to which is grafted an anion of lithium salt (LiTFSI or others), and a cross-linkable polyfunctional monomer having a function R that did not participate in the initial polymerization reaction that can be post-reacted for cross-linking. The triblock copolymer illustrated is of the type P(STFSILi-co-S(R))-b-PEO-b-P(STFSILi-co-S(R)) in which the reactive cross-linking functions are R.

The triblock or the diblock copolymers according to the invention can be prepared by any method of controlled radical polymerization (ATRP ("Atom Transfer Radical Polymerization"), RAFT ("Reversible Addition Fragmentation Chain Transfer"), NMP ("Nitroxide-Mediated Radical Polymerization")) and ionic polymerizations like anionic or cationic, either directly with a vinyl monomer bearing a salt of hydrogen or lithium or potassium or sodium group or indirectly with a functionalization of the polymer by grafting the KTFSI group. This polymerization or functionalization is then followed or not (in case of lithium) by a step of ionic exchange to replace the K⁺, H⁺ or Na⁺ cation by a Li⁺ cation. The final cross-linking reaction creates a cross-linking network between the various polymer chains thereby substantially increasing the mechanical strength of the solid polymer electrolyte 16

The relative proportions of the polymers of block A and B in the mixture may be adjusted so as to give the desired properties of mechanical hardness and adhesion of the films of electrolyte 16, to be able to use the most adequate process of coating, and depending on the molecular weight of the component of block B. Thus, a larger proportion of the compound of block B will lead to a film of higher mechanical hardness but less adhesive to the electrodes, and provide less viscous mixtures, which are easier to coat by gravure, reverse roll, extrusion or hot melt processes. On the other hand, a larger proportion of the polymer of block A will produce a film having a better adhesion to the electrodes which can be obtained by extrusion or hot melt processes. In a preferred embodiment, the proportions of the polymers of block A relative to block B is between 40% and 80%.

Figure 3:
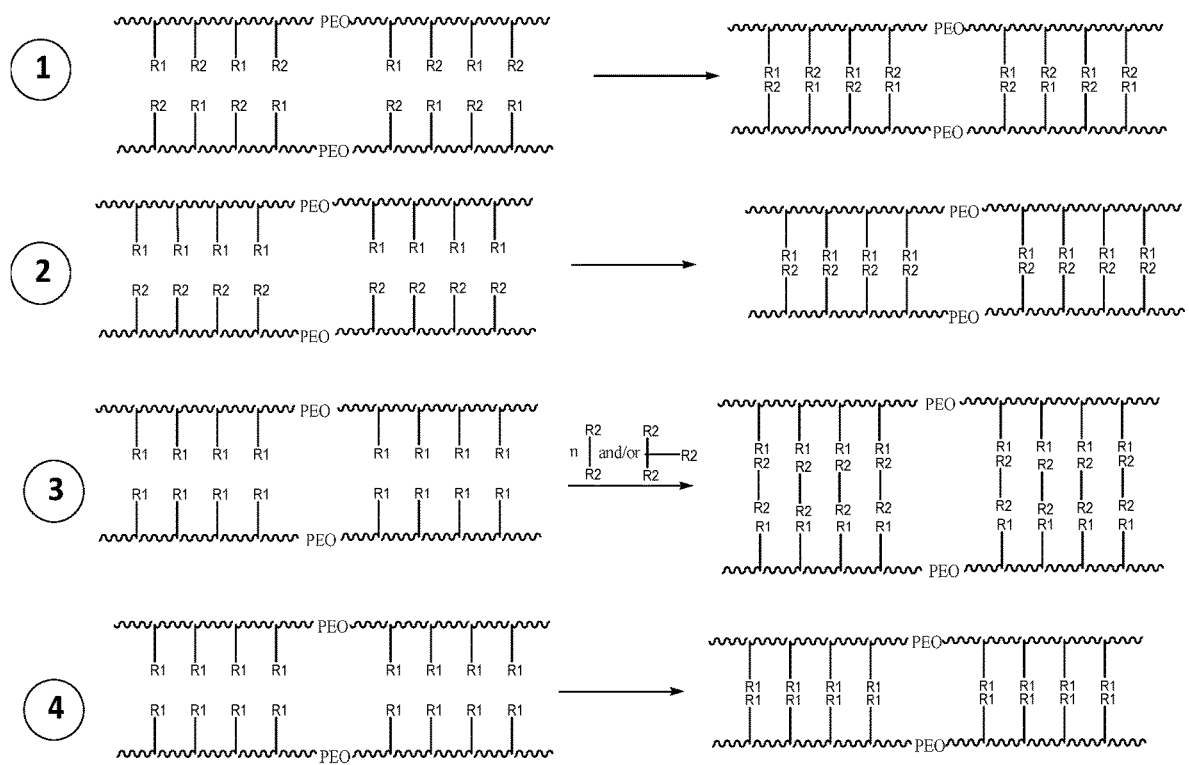
FIG. 3 is schematic representation of four specific synthesis routes for cross-linking PEO copolymer chains.

In order to prepare cross-linked triblock or diblock copolymer based on PEO as illustrated in FIG. 2, several synthesis pathways are possible. There are four specific paths for cross-linking PEO copolymer chains between them as shown in FIG. 3. In order to simplify, only the triblock copolymer are illustrated. FIG. 3 schematically represents PEO copolymer chains all carrying cross-linkable polyfunctional monomer having pendant chemical functions represented as cross-linking functions R1 and/or R2, and grafted anionic groups of lithium salt (TFSI⁻ Li⁺ or others) wherein the grafted anionic groups of lithium salt is omitted for simplification of illustration.

The first path (1) involves two identical copolymer chains each having pendant chemical functions R1 and R2. These functions R1 and R2 are randomly distributed along the copolymer chains and cannot react with themselves but function R1 can react with function R2. In this way, the copolymer chains react with each other to form a cross-linked copolymer network.

The second path (2) involves two different copolymer chains, one carrying pendant chemical function R1 only and the other carrying pendant chemical function R2 only. These two functions R1 and R2 react with each other to form a cross-linked copolymer network.

The third path (3) is fundamentally different from the paths (1) and (2). The third path (3) involves two identical copolymer chains each carrying pendant chemical function R1 only that cannot react with itself. In order for the cross-linking reaction to take place, a small molecule carrying at least two chemical functions R2 that can react with chemical function R1 is added. When the identical copolymer chains are brought into contact with this small molecule carrying at least two chemical functions R2, a cross-linked copolymer network is obtained.

The fourth and last path (4) is the simplest. The identical copolymer chains each carry the same pendant chemical function R1 that can react with itself. When the identical copolymer chains are brought into contact, the pendant chemical functions R1 of each chain react with each other thereby forming a cross-linked copolymer network.

With regards to the first synthesis path (1), there is an example in which many copolymers carrying a function R1 of the type azide and a function R2 of the type propargyl protected by a silane or not.

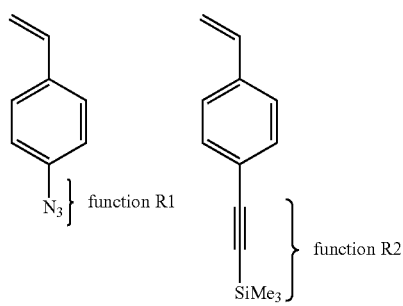

The reactive group may be a vinyl phenyl substituted in ortho or meta or para position. The vinyl phenyl may be replaced by an acrylate, a methacrylate, an allyl, an acrylamide, a methacrylamide or a vinyl. The two types of functions R1 and R2 can be linked to the reactive function of the monomer by a linear or cyclic alkyl or aryl or alkyl fluoride, an ether, ester, amide, thioether, tertiary amines, quaternary ammoniums, urethanes, thiourethane, silanes, ethylene glycol, propylene glycol, a low molecular weight poly(ethylene glycol), a low molecular weight poly(propylene glycol) or a mixture of these groups.

With regards to the second synthesis path (2), there are multiple examples. The first example is as follows: The first copolymer comprises a function R1 of the type alcohol or its salts. The second copolymer comprises a function R2 which may be a carboxylic acid or its salts, a isocyanate, or isothiocyanate, or oxirane, or sulfonic acid or its salts, or phosphonic acid or its salts, or carbonate or the halide (X: Cl, I or Br).

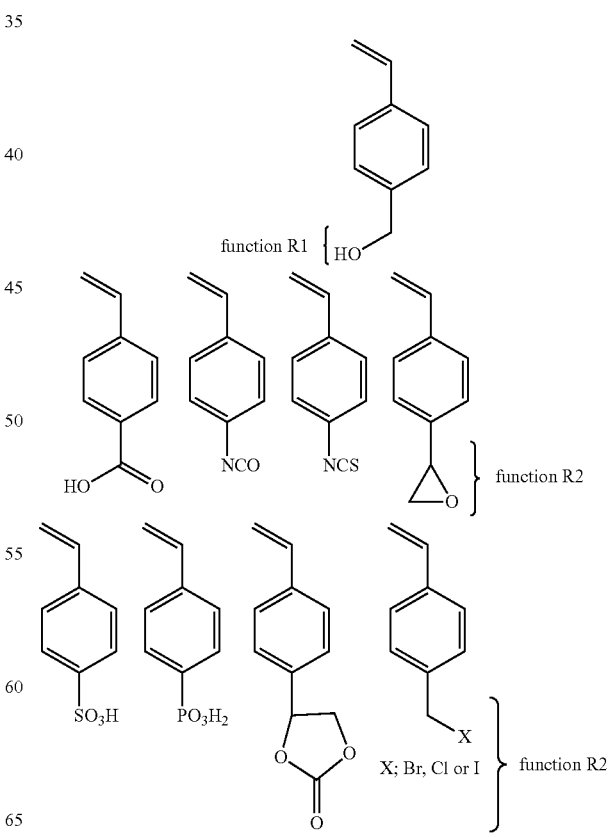

The reactive group may be a vinyl phenyl substituted in ortho or meta or para position. The vinyl phenyl may be replaced by an acrylate, a methacrylate, an allyl, an acrylamide, a methacrylamide or a vinyl. The two types of functions R1 and R2 can be linked to the reactive function of the monomer by a linear or cyclic alkyl or aryl or alkyl fluoride, an ether, ester, amide, thioether, tertiary amines, quaternary ammoniums, urethanes, thiourethane, silanes, ethylene glycol, propylene glycol, a low molecular weight poly(ethylene glycol), a low molecular weight poly(propylene glycol) or a mixture of these groups.

Another example of the second synthesis path (2) can be: The first copolymer comprises a function R1 of the type of an azide and a second copolymer includes a function R2 of the type of a propargyl protected by a silane or not.

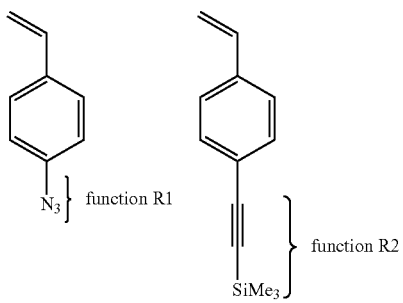

The reactive group may be a vinyl phenyl substituted in ortho or meta or para position. The vinyl phenyl may be replaced by an acrylate, a methacrylate, an allyl, an acrylamide, a methacrylamide or a vinyl. The two types of functions R1 and R2 can be linked to the reactive function of the monomer by a linear or cyclic alkyl or aryl or alkyl fluoride, an ether, ester, amide, thioether, tertiary amines, quaternary ammoniums, urethanes, thiourethane, silanes, ethylene glycol, propylene glycol, a low molecular weight poly(ethylene glycol), a low molecular weight poly(propylene glycol) or a mixture of these groups.

A third example of the second synthesis path (2) may be that the first copolymer comprises a group R1 of the type an oxirane and a second copolymer comprises a group R2 of sulfonic acid or its salts or a phosphonic acid or its salts.

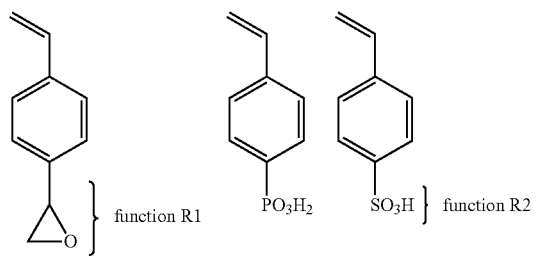

The reactive group may be a vinyl phenyl substituted in ortho or meta or para position. The vinyl phenyl may be replaced by an acrylate, a methacrylate, an allyl, an acrylamide, a methacrylamide or a vinyl. The two types of functions R1 and R2 can be linked to the reactive function of the monomer by a linear or cyclic alkyl or aryl or alkyl fluoride, an ether, ester, amide, thioether, tertiary amines, quaternary ammoniums, urethanes, thiourethane, silanes, ethylene glycol, propylene glycol, a low molecular weight poly(ethylene glycol), a low molecular weight poly(propylene glycol) or a mixture of these groups.

Another example of the second synthesis path (2) may be: A first copolymer comprising a function R1 of an amine primary or secondary (R: hydrogen atom, alkyl or aryl) and a second copolymer comprising a function R2 which may be an oxirane, a carboxylic acid or its salts, an aldehyde, a ketone, a sulfonic acid or its salts, a phosphonic acid or its salts, a cyclic carbonate, an isocyanate, an isothiocyanate, or an halide (X: Cl, I or Br)

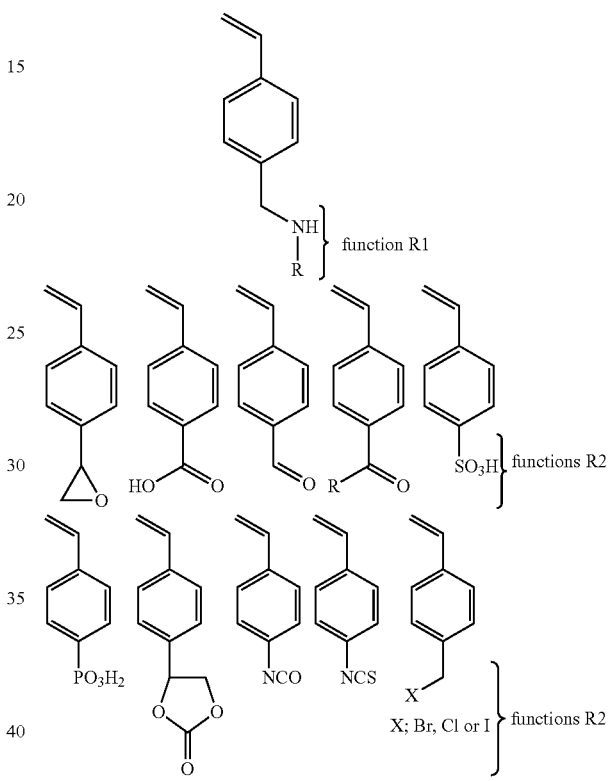

The reactive group may be a vinyl phenyl substituted in ortho or meta or para position. The vinyl phenyl may be replaced by an acrylate, a methacrylate, an allyl, an acrylamide, a methacrylamide or a vinyl. The two types of groups R1 and R2 can be linked to the reactive function of the monomer by a linear or cyclic alkyl or aryl or alkyl fluoride, an ether, ester, amide, thioether, tertiary amines, quaternary ammoniums, urethanes, thiourethane, silanes, ethylene glycol, propylene glycol, a low molecular weight poly(ethylene glycol), a low molecular weight poly(propylene glycol) or a mixture of these groups.

With regards to the third synthesis path (3), there are also multiple examples. The first example brings together two copolymers comprising functions R1 of the type alcohol or its salts. The reactive group may be a vinyl phenyl substituted in ortho or meta or para position. The vinyl phenyl may be replaced by an acrylate, a methacrylate, an allyl, an acrylamide, a methacrylamide or a vinyl. The small molecule includes multiple functions R2 (at least two) that can be a carboxylic acid or its salts, an isocyanate, a thioisocyanate, an oxirane, an ester, a sulfonic acid or its salts, a phosphonic acid or its salts, a cyclic carbonate, an acid halide (X: Cl, I or Br) or an halide (X: Cl, I or Br). The functions R2 may be linked together with R group that may be a linear or cyclic alkyl or aryl or alkyl fluoride, an ether, ester, amide, thioether, tertiary amines, quaternary ammoniums, urethanes, thiourethane, silanes, ethylene glycol, propylene glycol, a low molecular weight poly(ethylene glycol), a low molecular weight poly(propylene glycol) or a mixture of these groups. The function R1 can be linked to the reactive function of the monomer by a linear or cyclic alkyl or aryl or alkyl fluoride, an ether, ester, amide, thioether, tertiary amines, quaternary ammoniums, urethanes, thiourethane, silanes, ethylene glycol, propylene glycol, a low molecular weight poly(ethylene glycol), a low molecular weight poly(propylene glycol) or a mixture of these groups.

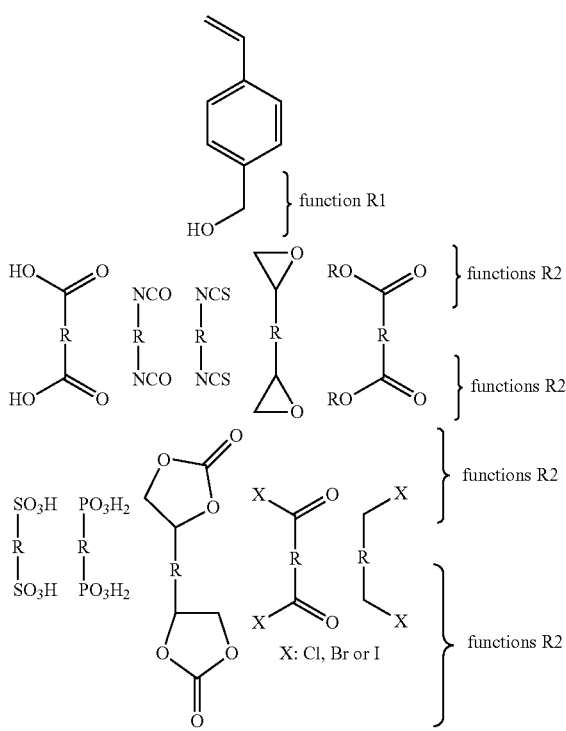

The second example of the third synthesis path (3) brings together two copolymers comprising functions R1 of the type primary or secondary amine (R: hydrogen atom, alkyl chain, benzene rings). The reactive group may be a vinyl phenyl substituted in ortho or meta or para position. The vinyl phenyl may be replaced by an acrylate, a methacrylate, an allyl, an acrylamide, a methacrylamide or a vinyl. The small molecule includes multiple functions R2 (at least two) that can be a carboxylic acid or its salts, an isocyanate, a thioisocyanate, an oxirane, an ester, a sulfonic acid or its salts, a phosphonic acid or its salts, a cyclic carbonate, an acid halide (X: Cl, I or Br), an aldehyde or a ketone. The functions R2 may be linked together with a R group that may be a linear or cyclic alkyl or aryl or alkyl fluoride, an ether, ester, amide, thioether, tertiary amines, quaternary ammoniums, urethanes, thiourethane, silanes, ethylene glycol, propylene glycol, a low molecular weight poly(ethylene glycol), a low molecular weight poly(propylene glycol) or a mixture of these groups. The function R1 can be linked to the reactive function of the monomer by a linear or cyclic alkyl or aryl or alkyl fluoride, an ether, ester, amide, thioether, tertiary amines, quaternary ammoniums, urethanes, thiourethane, silanes, ethylene glycol, propylene glycol, a low molecular weight poly(ethylene glycol), a low molecular weight poly(propylene glycol) or a mixture of these groups.

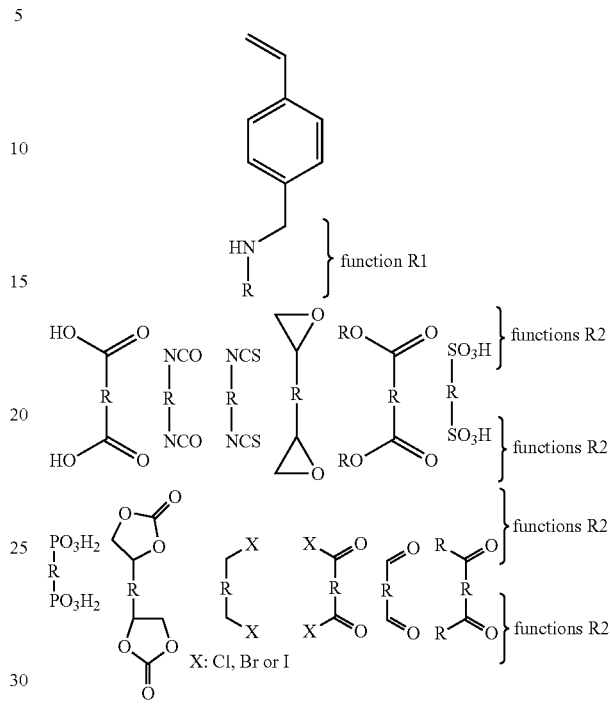

The third example of the third synthesis path (3) brings together two copolymers comprising functions R1 of the type carboxylic acid or its salts. The reactive group may be a vinyl phenyl substituted in ortho or meta or para position. The vinyl phenyl may be replaced by an acrylate, a methacrylate, an allyl, an acrylamide, a methacrylamide or a vinyl. The small molecule includes multiple functions R2 (at least two) that can be an alcohol or its salts, a primary amine or a secondary amine. The functions R2 may be linked together with a R group that may be a linear or cyclic alkyl or aryl or alkyl fluoride, an ether, ester, amide, thioether, tertiary amines, quaternary ammoniums, urethanes, thiourethane, silanes, ethylene glycol, propylene glycol, a low molecular weight poly(ethylene glycol), a low molecular weight poly(propylene glycol) or a mixture of these groups. The function R1 can be linked to the reactive function of the monomer by a linear or cyclic alkyl or aryl or alkyl fluoride, an ether, ester, amide, thioether, tertiary amines, quaternary ammoniums, urethanes, thiourethane, silanes, ethylene glycol, propylene glycol, a low molecular weight poly(ethylene glycol), a low molecular weight poly(propylene glycol) or a mixture of these groups.

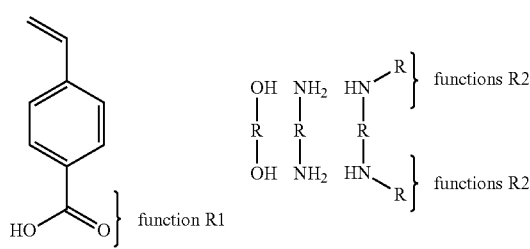

The fourth example of the third synthesis path (3) brings together two copolymers comprising functions R1 of the type sulfonic acid or its salts. The reactive group may be a vinyl phenyl substituted in ortho or meta or para position. The vinyl phenyl may be replaced by an acrylate, a methacrylate, an allyl, an acrylamide, a methacrylamide or a vinyl. The small molecule includes multiple functions R2 (at least two) that can be an alcohol or its salts, a primary amine, a secondary amine or an oxirane. The functions R2 may be linked together with a R group that may be a linear or cyclic alkyl or aryl or alkyl fluoride, an ether, ester, amide, thioether, tertiary amines, quaternary ammoniums, urethanes, thiourethane, silanes, ethylene glycol, propylene glycol, a low molecular weight poly(ethylene glycol), a low molecular weight poly(propylene glycol) or a mixture of these groups. The function R1 can be linked to the reactive function of the monomer by a linear or cyclic alkyl or aryl or alkyl fluoride, an ether, ester, amide, thioether, tertiary amines, quaternary ammoniums, urethanes, thiourethane, silanes, ethylene glycol, propylene glycol, a low molecular weight poly(ethylene glycol), a low molecular weight poly(propylene glycol) or a mixture of these groups.

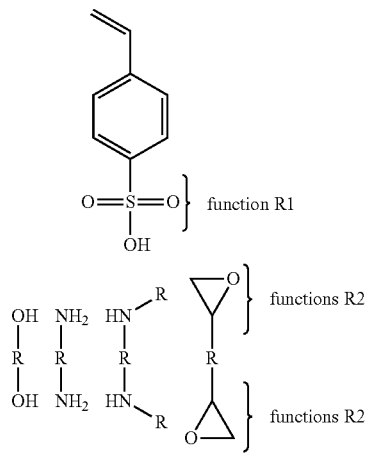

Another example of the third synthesis path (3) brings together two copolymers comprising functions R1 of the type halide. The reactive group may be a vinyl phenyl substituted in ortho or meta or para position. The vinyl phenyl may be replaced by an acrylate, a methacrylate, an allyl, an acrylamide, a methacrylamide or a vinyl. The small molecule includes multiple functions R2 (at least two) that can be an alcohol or its salts, or a primary amine. The functions R2 may be linked together with a R group that may be a linear or cyclic alkyl or aryl or alkyl fluoride, an ether, ester, amide, thioether, tertiary amines, quaternary ammoniums, urethanes, thiourethane, silanes, ethylene glycol, propylene glycol, a low molecular weight poly(ethylene glycol), a low molecular weight poly(propylene glycol) or a mixture of these groups. The function R1 can be linked to the reactive function of the monomer by a linear or cyclic alkyl or aryl or alkyl fluoride, an ether, ester, amide, thioether, tertiary amines, quaternary ammoniums, urethanes, thiourethane, silanes, ethylene glycol, propylene glycol, a low molecular weight poly(ethylene glycol), a low molecular weight poly(propylene glycol) or a mixture of these groups.

X: Cl, I or Br

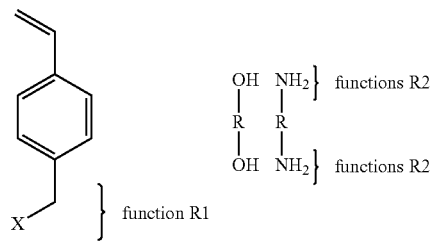

Another example of the third synthesis path (3) brings together two copolymers comprising functions R1 of the type oxirane. The reactive group may be a vinyl phenyl substituted in ortho or meta or para position. The vinyl phenyl may be replaced by an acrylate, a methacrylate, an allyl, an acrylamide, a methacrylamide or a vinyl. The small molecule includes multiple functions R2 (at least two) that can be a phosphonic acid or its salts, a sulfonic acid or its salts, an alcohol or its salts, a primary amine or a secondary amine. The functions R2 may be linked together with a R group that may a linear or cyclic alkyl or aryl or alkyl fluoride, an ether, ester, amide, thioether, tertiary amines, quaternary ammoniums, urethanes, thiourethane, silanes, ethylene glycol, propylene glycol, a low molecular weight poly(ethylene glycol), a low molecular weight poly(propylene glycol) or a mixture of these groups. The function R1 can be linked to the reactive function of the monomer by a linear or cyclic alkyl or aryl or alkyl fluoride, an ether, ester, amide, thioether, tertiary amines, quaternary ammoniums, urethanes, thiourethane, silanes, ethylene glycol, propylene glycol, a low molecular weight poly(ethylene glycol), a low molecular weight poly(propylene glycol) or a mixture of these groups.

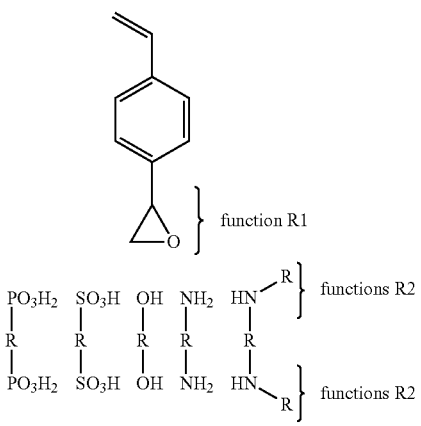

Another example of the third synthesis path (3) brings together two copolymers comprising functions R1 of the type cyclic carbonate. The reactive group may be a vinyl phenyl substituted in ortho or meta or para position. The vinyl phenyl may be replaced by an acrylate, a methacrylate, an allyl, an acrylamide, a methacrylamide or a vinyl. The small molecule includes multiple functions R2 (at least two) that can be an alcohol or its salts, a primary amine or a secondary amine. The functions R2 may be linked together with a R group that may be a linear or cyclic alkyl or aryl or alkyl fluoride, an ether, ester, amide, thioether, tertiary amines, quaternary ammoniums, urethanes, thiourethane, silanes, ethylene glycol, propylene glycol, a low molecular weight poly(ethylene glycol), a low molecular weight poly (propylene glycol) or a mixture of these groups. The function R1 can be linked to the reactive function of the monomer by a linear or cyclic alkyl or aryl or alkyl fluoride, an ether, ester, amide, thioether, tertiary amines, quaternary ammoniums, urethanes, thiourethane, silanes, ethylene glycol, propylene glycol, a low molecular weight poly(ethylene glycol), a low molecular weight poly(propylene glycol) or a mixture of these groups.

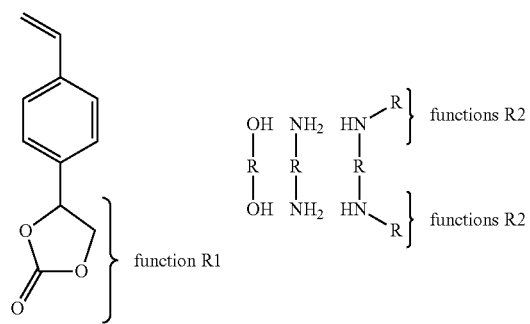

Another example of the third synthesis path (3) brings together two copolymers comprising functions R1 of the type isocyanate. The reactive group may be a vinyl phenyl substituted in ortho or meta or para position. The vinyl phenyl may be replaced by an acrylate, a methacrylate, an allyl, an acrylamide, a methacrylamide or a vinyl. The small molecule includes multiple functions R2 (at least two) that can be an alcohol or its salts, a primary amine or a secondary amine. The functions R2 may be linked together with a R group that may a linear or cyclic alkyl or aryl or alkyl fluoride, an ether, ester, amide, thioether, tertiary amines, quaternary ammoniums, urethanes, thiourethane, silanes, ethylene glycol, propylene glycol, a low molecular weight poly(ethylene glycol), a low molecular weight poly(propylene glycol) or a mixture of these groups. The function R1 can be linked to the reactive function of the monomer by a linear or cyclic alkyl or aryl or alkyl fluoride, an ether, ester, amide, thioether, tertiary amines, quaternary ammoniums, urethanes, thiourethane, silanes, ethylene glycol, propylene glycol, a low molecular weight poly(ethylene glycol), a low molecular weight poly(propylene glycol) or a mixture of these groups.

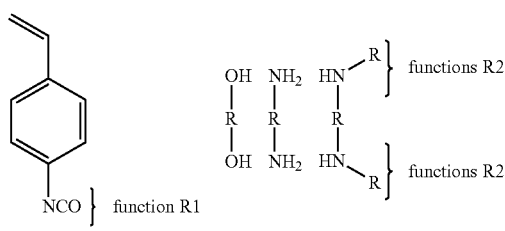

Another example of the third synthesis path (3) brings together two copolymers comprising functions R1 of the type isothiocyanate. The reactive group may be a vinyl phenyl substituted in ortho or meta or para position. The vinyl phenyl may be replaced by an acrylate, a methacrylate, an allyl, an acrylamide, a methacrylamide or a vinyl. The small molecule includes multiple functions R2 (at least two) that can be an alcohol or its salts, a primary amine or a secondary amine. The functions R2 may be linked together with a R group that may be a linear or cyclic alkyl or aryl or alkyl fluoride, an ether, ester, amide, thioether, tertiary amines, quaternary ammoniums, urethanes, thiourethane, silanes, ethylene glycol, propylene glycol, a low molecular weight poly(ethylene glycol), a low molecular weight poly (propylene glycol) or a mixture of these groups. The function R1 can be linked to the reactive function of the monomer by a linear or cyclic alkyl or aryl or alkyl fluoride, an ether, ester, amide, thioether, tertiary amines, quaternary ammoniums, urethanes, thiourethane, silanes, ethylene glycol, propylene glycol, a low molecular weight poly(ethylene glycol), a low molecular weight poly(propylene glycol) or a mixture of these groups.

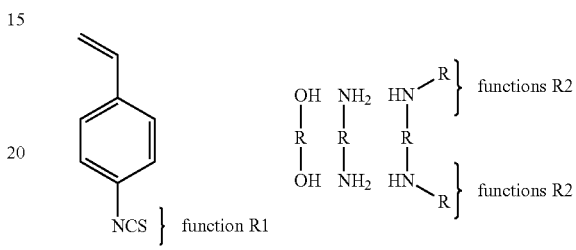

Another example of the third synthesis path (3) brings together two copolymers comprising functions R1 of the type aldehyde or ketone. The reactive group may be a vinyl phenyl substituted in ortho or meta or para position. The vinyl phenyl may be replaced by an acrylate, a methacrylate, an allyl, an acrylamide, a methacrylamide or a vinyl. The small molecule includes multiple functions R2 (at least two) that can be a primary amine. The functions R2 may be linked together with a R group that may be a linear or cyclic alkyl or aryl or alkyl fluoride, an ether, ester, amide, thioether, tertiary amines, quaternary ammoniums, urethanes, thiourethane, silanes, ethylene glycol, propylene glycol, a low molecular weight poly(ethylene glycol), a low molecular weight poly(propylene glycol) or a mixture of these groups. The function R1 can be linked to the reactive function of the monomer by a linear or cyclic alkyl or aryl or alkyl fluoride, an ether, ester, amide, thioether, tertiary amines, quaternary ammoniums, urethanes, thiourethane, silanes, ethylene glycol, propylene glycol, a low molecular weight poly(ethylene glycol), a low molecular weight poly(propylene glycol) or a mixture of these groups.

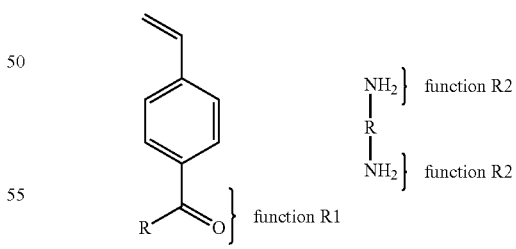

Another example of the third synthesis path (3) brings together two copolymers comprising functions R1 of the type alcohol. The reactive group may be a vinyl phenyl substituted in ortho or meta or para position. The vinyl phenyl may be replaced by an acrylate, a methacrylate, an allyl, an acrylamide, a methacrylamide or a vinyl. The small molecule includes multiple functions R2 (at least two) that can be a trichlorosilane, a carboxylic acid or its salts, an acid halide (X: Cl, I or Br) or an halide (X: Cl, I or Br). The functions R2 may be linked together with a R group that may be a linear or cyclic alkyl or aryl or alkyl fluoride, an ether, ester, amide, thioether, tertiary amines, quaternary ammoniums, urethanes, thiourethane, silanes, ethylene glycol, propylene glycol, a low molecular weight poly(ethylene glycol), a low molecular weight poly(propylene glycol) or a mixture of these groups. The function R1 can be linked to the reactive function of the monomer by a linear or cyclic alkyl or aryl or alkyl fluoride, an ether, ester, amide, thioether, tertiary amines, quaternary ammoniums, urethanes, thiourethane, silanes, ethylene glycol, propylene glycol, a low molecular weight poly(ethylene glycol), a low molecular weight poly(propylene glycol) or a mixture of these groups.

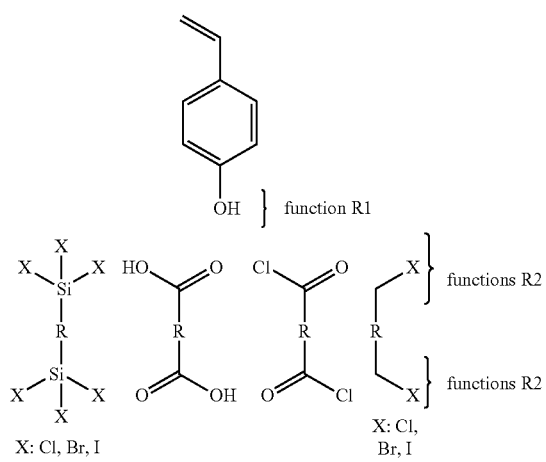

Another example of the third synthesis path (3) brings together two copolymers comprising functions R1 of the type azide. The reactive group may be a vinyl phenyl substituted in ortho or meta or para position. The vinyl phenyl may be replaced by an acrylate, a methacrylate, an allyl, an acrylamide, a methacrylamide or a vinyl. The small molecule includes multiple functions R2 (at least two) that can be a propargyl. The functions R2 may be linked together with a R group that may be a linear or cyclic alkyl or aryl or alkyl fluoride, an ether, ester, amide, thioether, tertiary amines, quaternary ammoniums, urethanes, thiourethane, silanes, ethylene glycol, propylene glycol, a low molecular weight poly(ethylene glycol), a low molecular weight poly(propylene glycol) or a mixture of these groups. The function R1 can be linked to the reactive function of the monomer by a linear or cyclic alkyl or aryl or alkyl fluoride, an ether, ester, amide, thioether, tertiary amines, quaternary ammoniums, urethanes, thiourethane, silanes, ethylene glycol, propylene glycol, a low molecular weight poly(ethylene glycol), a low molecular weight poly(propylene glycol) or a mixture of these groups.

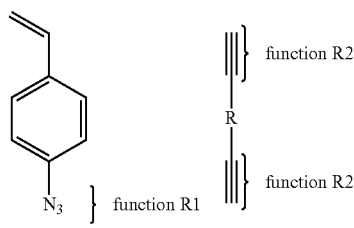

A final example of the third synthesis path (3) brings together two copolymers comprising functions R1 of the type propargyl protected by a silane or not. The reactive group may be a vinyl phenyl substituted in ortho or meta or para position. The vinyl phenyl may be replaced by an acrylate, a methacrylate, an allyl, an acrylamide, a methacrylamide or a vinyl. The small molecule includes multiple functions R2 (at least two) that can be an azide. The functions R2 may be linked together with a R group that may be a linear or cyclic alkyl or aryl or alkyl fluoride, an ether, ester, amide, thioether, tertiary amines, quaternary ammoniums, urethanes, thiourethane, silanes, ethylene glycol, propylene glycol, a low molecular weight poly(ethylene glycol), a low molecular weight poly(propylene glycol) or a mixture of these groups. The function R1 can be linked to the reactive function of the monomer by a linear or cyclic alkyl or aryl or alkyl fluoride, an ether, ester, amide, thioether, tertiary amines, quaternary ammoniums, urethanes, thiourethane, silanes, ethylene glycol, propylene glycol, a low molecular weight poly(ethylene glycol), a low molecular weight poly(propylene glycol) or a mixture of these groups.

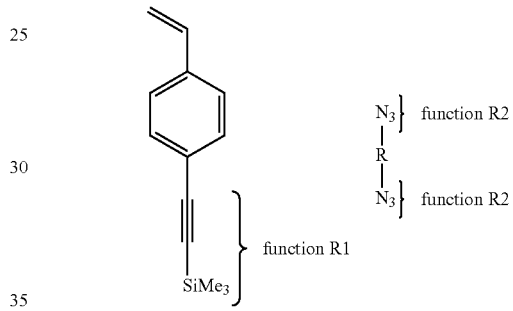

With regards to the fourth and last path (4), which brings into play identical copolymer chains each carry the same pendant chemical function R1 that can react with itself. The first example brings together two copolymers comprising functions R1 of the type thymine. The reactive group may be a vinyl phenyl substituted in ortho or meta or para position. The vinyl phenyl may be replaced by an acrylate, a methacrylate, an allyl, an acrylamide, a methacrylamide or a vinyl. The function R1 can be linked to the reactive function of the monomer by a linear or cyclic alkyl or aryl or alkyl fluoride, an ether, ester, amide, thioether, tertiary amines, quaternary ammoniums, urethanes, thiourethane, silanes, ethylene glycol, propylene glycol, a low molecular weight poly(ethylene glycol), a low molecular weight poly(propylene glycol) or a mixture of these groups.

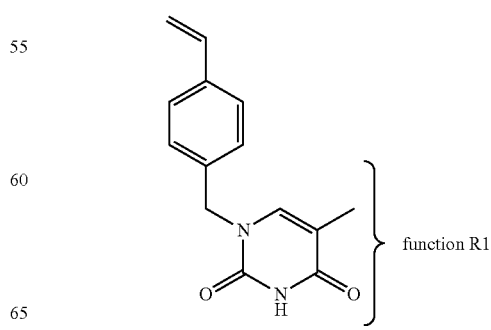

The second example of the fourth path (4) brings together two copolymers comprising functions R1 of the type cinnamate. The reactive group may be a vinyl phenyl substituted in ortho or meta or para position. The vinyl phenyl may be replaced by an acrylate, a methacrylate, an allyl, an acrylamide, a methacrylamide or a vinyl The function R1 can be linked to the reactive function of the monomer by a linear or cyclic alkyl or aryl or alkyl fluoride, an ether, ester, amide, thioether, tertiary amines, quaternary ammoniums, urethanes, thiourethane, silanes, ethylene glycol, propylene glycol, a low molecular weight poly(ethylene glycol), a low molecular weight poly(propylene glycol) or a mixture of these groups.

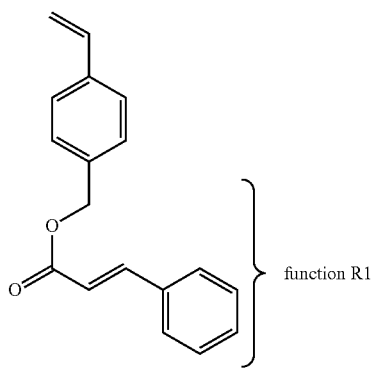 [SMILES: C=Cc1ccc(COC(=O)/C=C/c2ccccc2)cc1]

function R1

The third example of the fourth path (4) brings together two copolymers comprising functions R of the type coumarine. The reactive group may be a vinyl phenyl substituted in ortho or meta or para position. The vinyl phenyl may be replaced by an acrylate, a methacrylate, an allyl, an acrylamide, a methacrylamide or a vinyl. The function R1 can be linked to the reactive function of the monomer by a linear or cyclic alkyl or aryl or alkyl fluoride, an ether, ester, amide, thioether, tertiary amines, quaternary ammoniums, urethanes, thiourethane, silanes, ethylene glycol, propylene glycol, a low molecular weight poly(ethylene glycol), a low molecular weight poly(propylene glycol) or a mixture of these groups.

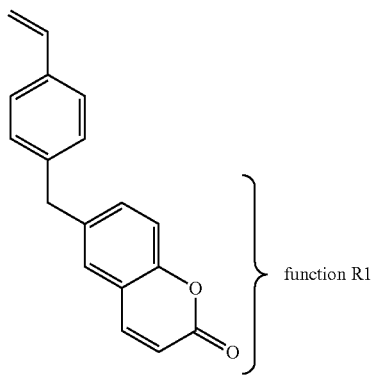 [SMILES: C=Cc1ccc(Cc2ccc3oc(=O)ccc3c2)cc1]

function R1

The fourth example of the fourth path (4) brings together two copolymers comprising functions R1 of the type phenyl 4-(3'-buten-1'-oxy)-2,3,5,6-tetrafluoro. The reactive group may be a vinyl phenyl substituted in ortho or meta or para position. The vinyl phenyl may be replaced by an acrylate, a methacrylate, an allyl, an acrylamide, a methacrylamide or a vinyl The function R1 can be linked to the reactive function of the monomer by a linear or cyclic alkyl or aryl or alkyl fluoride, an ether, ester, amide, thioether, tertiary amines, quaternary ammoniums, urethanes, thiourethane, silanes, ethylene glycol, propylene glycol, a low molecular weight poly(ethylene glycol), a low molecular weight poly(propylene glycol) or a mixture of these groups.

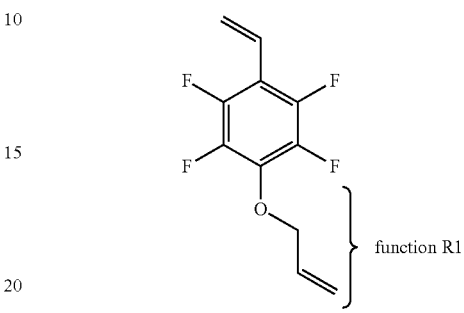

function R1

As shown in FIG. 2, the grafted anion of lithium salt is in the non-conductive portion of the triblock copolymer and as such, all grafted anions of lithium salt may not all be available during battery operation. In order to increase the accessibility of these grafted anions of lithium salt, the triblock copolymer may be mixed with a cross-linkable polyoxyethylene glycol diacrylate or dimethacrylate of low molecular weight (<20,000 g/mol) such as $PEG_{200}$ commercially available from Sigma-Aldrich for example. The $PEG_{200}$ which is ionically conductive is mixed with the triblock copolymer and cross-linked in the final formation of the solid polymer electrolyte 16 and provides access to the grafted anions of lithium salt such that these grafted anions become part of the ionic path for Li ions migrating through the solid polymer electrolyte 16.

Figure 4:
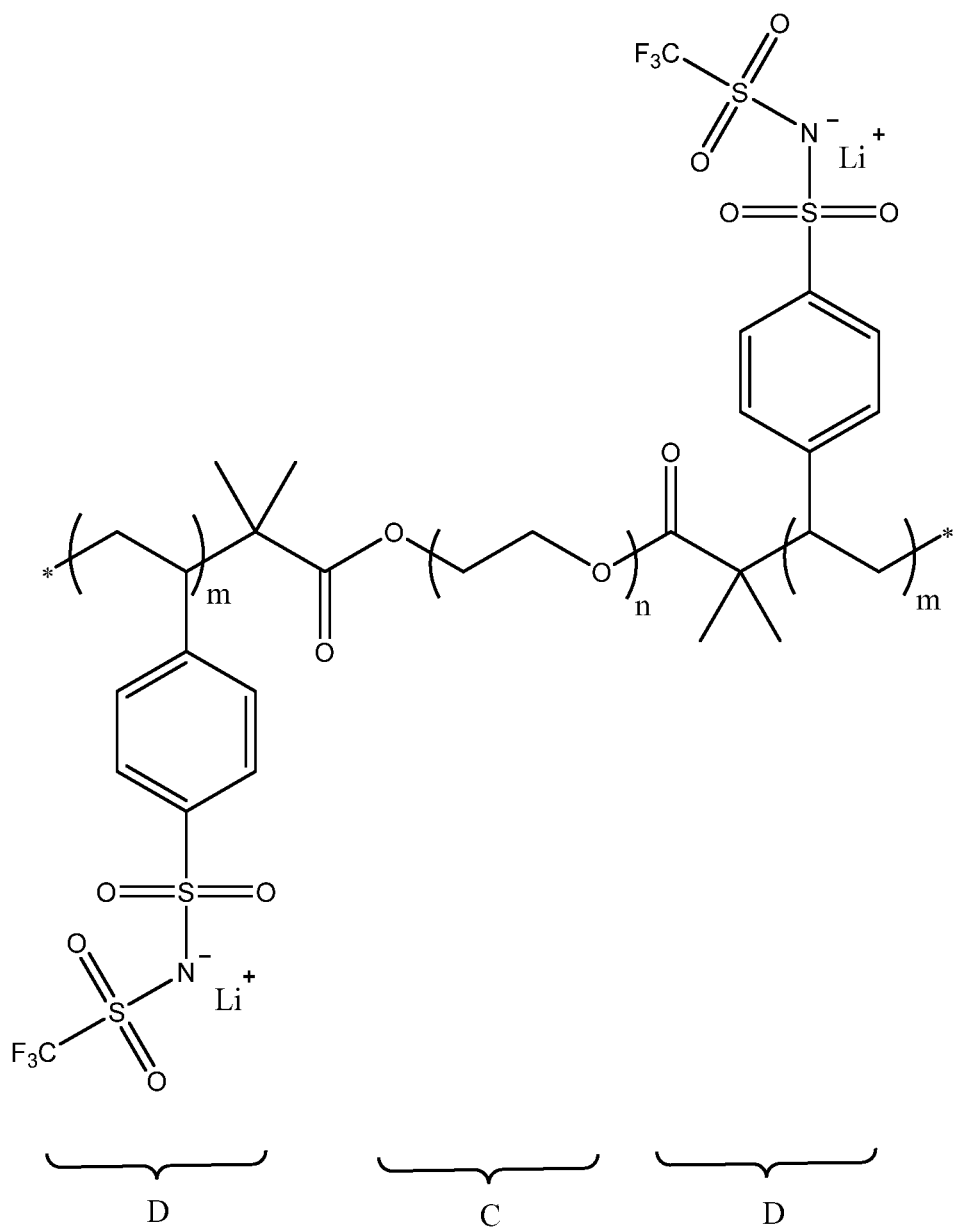
FIG. 4 is schematic representation of a triblock copolymer of the type P(STFSILi)-b-PEO-b-P(STFSILi) included in a solid polymer electrolyte in accordance with a second embodiment of the invention.

In a specific embodiment as illustrated in FIG. 4, a triblock copolymer of the type P(STFSILi)-b-PEO-b-P(STFSILi) which does not have a remaining cross-linkable function may also be used when mixed with a cross-linkable polyoxyethylene glycol diacrylate or dimethacrylate of low molecular weight (<20,000 g/mol) such as $PEG_{200}$ commercially available from Sigma-Aldrich for example. The cross-linkable $PEG_{200}$ when cross-linked provides added mechanical strength to the solid polymer electrolyte 16. As previously described, the $PEG_{200}$ is ionically conductive and when mixed with the triblock copolymer and cross-linked in the final formation of the solid polymer electrolyte 16, provides better access to the grafted anions of lithium salt such that these grafted anions are more easily accessible and become part of the ionic path for Li ions migrating through the solid polymer electrolyte 16.

Other cross-linkable monomer, homopolymer or copolymer having low molecular weight (<20,000 g/mol) can also be used which include a functional group enabling cross-linking issued from a polymer of at least one monomer selected from vinyl phenyl substituted in meta, ortho or para, acrylates and methacrylates, acrylamide, methacrylamide allyl, vinyl or compounds having at least one reactive double bond.

It goes without saying that, whatever the mixture or proportion selected; a lithium salt should be added in the final mixture in order to provide adequate ionic conductivity to the final solid polymer electrolyte 16. The lithium salts previously described which provide added ionic conductivity to the solid polymer electrolyte 16 are respectively LiCF$_3$SO$_3$, LiB(C$_2$O$_4$)$_2$, LiN(CF$_3$SO$_2$)$_2$, LiN(FSO$_2$)$_2$, LiC(CF$_3$SO$_2$)$_3$, LiC(CH$_3$)(CF$_3$SO$_2$)$_2$, LiCH(CF$_3$SO$_2$)$_2$, LiCH$_2$(CF$_3$SO$_2$), LiC$_2$F$_5$SO$_3$, LiN(C$_2$F$_5$SO$_2$)$_2$, LiN(CF$_3$SO$_2$), LiB(CF$_3$SO$_2$)$_2$, LiPF$_6$, LiSbF$_6$, LiSCN, LiAsF$_6$, LiBF$_4$, and LiClO$_4$.

Tests performed show that the use of a including a triblock copolymer in accordance with the invention included in a solid polymer electrolyte in a lithium metal battery leads to an energy storage device having excellent mechanical resistance at temperature above ambient temperature and excellent ionic conductivity. The solid polymer electrolyte according to the present invention also has good mechanical strength and durability, and high thermal stability thereby limiting the development of concentration gradients in the electrolyte during discharge (or during charging). The use of this solid polymer electrolyte in a lithium metal battery makes it possible to limit dendritic growth of the lithium enabling quick and safe recharging. The solid polymer electrolyte according to the present invention substantially reduces the formation of heterogeneous electrodeposits of lithium (including dendrites) during recharging.

The solid polymer electrolyte 16 is stronger than prior art solid polymer electrolytes and may therefore be made thinner than prior art polymer electrolytes. As outlined above the solid polymer electrolyte 16 may be as thin as 5 microns. A thinner electrolyte in a battery results in a lighter battery and therefore a battery having a higher energy density. The increased strength of the solid polymer electrolyte 16 renders it more stable in manufacturing processes. The solid polymer electrolyte 16 is more tear resistant and may be less likely to wrinkle in the production process.

Figure 5:
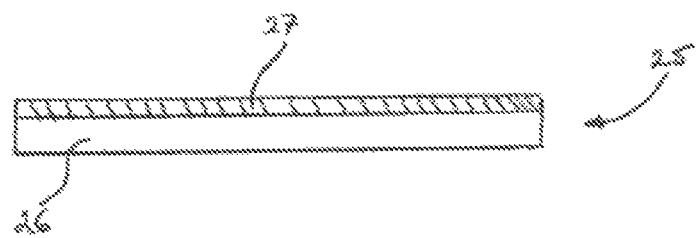
FIG. 5 is schematic representation of a bilayer solid polymer electrolyte in accordance with one embodiment of the invention.
Figure 6:
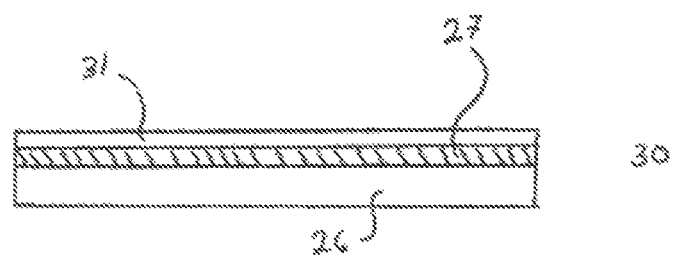
FIG. 6 is schematic representation of a trilayer solid polymer electrolyte in accordance with one embodiment of the invention.

As illustrated in FIG. 5, in one specific embodiment, the solid polymer electrolyte 25 consists of a bilayer assembly comprising a base layer 26 of between 5 and 50 microns consisting of a standard homopolymer or copolymer of polyethylene oxide as described in U.S. Pat. No. 6,855,788 or a blend of homopolymer or copolymer as described in EP2235784 both of which are incorporated by reference, and a thin surface layer 27 of less than 20 microns consisting of one of the triblock copolymer of the BAB type described above. The thin surface layer 27 being pressed against the lithium metal anode to provide a barrier against dendrites' growth. In another embodiment as illustrated in FIG. 6, the solid polymer electrolyte 30 consists of a trilayer assembly comprising a base layer 26 of between 5 and 50 microns consisting of a standard homopolymer or copolymer of polyethylene oxide as described in U.S. Pat. No. 6,855,788 or a blend of homopolymer or copolymer as described in EP2235784 both of which are incorporated by reference, a thin layer 27 of less than 20 microns consisting of one of the triblock copolymer of the BAB type described above and a thin surface layer 31 consisting of a standard homopolymer or copolymer of polyethylene oxide described above acting as an adhesion promoter on the lithium metal anode.

Modifications and improvement to the above described embodiments of the present invention may become apparent to those skilled in the art. The foregoing description is intended to be exemplary rather than limiting. Furthermore, the dimensions of features of various components that may appear on the drawings are not meant to be limiting, and the size of the components therein can vary from the size that may be portrayed in the figures herein. The scope of the present invention is therefore intended to be limited solely by the scope of the appended claims.

What is claimed is:

1. A solid polymer electrolyte for a battery, the solid polymer electrolyte including a diblock copolymer of AB type or a triblock copolymer of BAB type, in which:
   block A is an unsubstituted polyethylene oxide chain having a number-average molecular weight less than 80,000 g/mol;
   block B is an anionic polymer prepared from:
   (i) one or more monomers selected from vinyl monomers wherein block A and block B have the following formula:

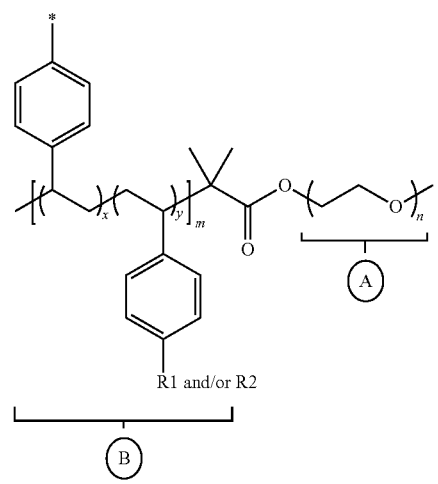

and to which is grafted at * an anion of lithium salt selected from the group consisting of LiCF$_3$SO$_3$, LiB(C$_2$O$_4$)$_2$, LiN(CF$_3$SO$_2$)$_2$, LiN(FSO$_2$)$_2$, LiC(CF$_3$SO$_2$)$_3$, LiC(CH$_3$)(CF$_3$SO$_2$)$_2$, LiCH(CF$_3$SO$_2$)$_2$, LiCH$_2$(CF$_3$SO$_2$), LiC$_2$F$_5$SO$_3$, LiN(C$_2$F$_5$SO$_2$)$_2$, LiN(CF$_3$SO$_2$), LiB(CF$_3$SO$_2$)$_2$, LiPF$_6$, LiSbF$_6$, LiClO$_4$, LiSCN, LiAsF$_6$, and LiBF$_4$; and
   wherein m is ≥1, x is ≥1, y is ≥1 and n is ≥1; and
   (ii) the one or more monomers are cross-linkable polyfunctional monomers having pendant chemical functions R1 and/or R2, the cross-linkable polyfunctional monomers including reactive groups for reaction during polymerization of the copolymer, the reactive groups selected from the group consisting of a vinyl phenyl substituted in ortho, meta or para position, an acrylate, a methacrylate, an allyl, an acrylamide, a methacrylamide and a vinyl;
   wherein, after the polymerization of the copolymer, the pendant chemical functions R1 and/or R2 are cross-linked to form a cross-linked copolymer network: and wherein proportion of the unsubstituted polyethylene oxide chain of block A relative to the anionic polymer of block B is between 40% and 80%.

2. The solid polymer electrolyte as defined in claim 1, wherein the pendant chemical functions R1 and/or R2 are localized at the end of the block B of the copolymer or statistically or block or alternate or gradient distributed in the block B of the copolymer.

3. The solid polymer electrolyte as defined in claim 1, wherein the pendant chemical functions R1 and/or R2 are linked to the reactive groups of the polyfunctional monomers by a linear or cyclic alkyl or aryl or alkyl fluoride, an ether, ester, amide, thioether, tertiary amines, quaternary ammoniums, urethanes, thiourethane, silanes, ethylene glycol, propylene glycol, a low molecular weight poly(ethylene glycol), a low molecular weight poly(propylene glycol) or a mixture of these groups.

4. The solid polymer electrolyte as defined in claim 1, comprising identical copolymer chains each having cross-linkable polyfunctional monomers having pendant chemical functions R1 and R2 randomly distributed along the block B of the copolymer chain, and wherein functions R1 and R2 react with each other to form the cross-linked copolymer network.

5. The solid polymer electrolyte as defined in claim 1, comprising two different copolymer chains having cross-linkable polyfunctional monomers, a first copolymer chain carrying pendant chemical function R1 only and a second copolymer chain carrying pendant chemical function R2 only, and wherein functions R1 and R2 react with each other to form the cross-linked copolymer network.

6. The solid polymer electrolyte as defined in claim 1, comprising identical copolymer chains each having cross-linkable polyfunctional monomers having pendant chemical function R1 only that cannot react with itself, and a small molecule carrying at least two chemical functions R2 that can react with chemical function R1, wherein the pendant chemical function R1 of the identical copolymer chains reacts with the at least two chemical functions R2 of the small molecule to form the cross-linked copolymer network.

7. The solid polymer electrolyte as defined in claim 1, comprising identical copolymer chains each having cross-linkable polyfunctional monomers having pendant chemical function R1 only that can react with itself, wherein the pendant chemical functions R1 of each identical copolymer chains react with each other to form a cross-linked copolymer network.

8. The solid polymer electrolyte as defined in claim 4, wherein the copolymer chains each carry as a function R1, an azide and as a function R2, a propargyl protected by a silane or not.

9. The solid polymer electrolyte as defined in claim 5, wherein the first copolymer chain comprises a function R1 of the type alcohol or its salts and the second copolymer chain comprises a function R2 selected from the group consisting of a carboxylic acid or its salts, a isocyanate, a isothiocyanate, an oxirane, a sulfonic acid or its salts, a phosphonic acid or its salts, a carbonate and an halide (X: Cl, I or Br).

10. The solid polymer electrolyte as defined in claim 5, wherein the first copolymer chain comprises a function R1 of the type azide and the second copolymer chain comprises a function R2 of the type propargyl protected by a silane or not.

11. The solid polymer electrolyte as defined in claim 5, wherein the first copolymer chain comprises a function R1 of the type oxirane and the second copolymer chain comprises a function R2 selected from the group consisting of sulfonic acid or its salts and phosphonic acid or its salts.

12. The solid polymer electrolyte as defined in claim 5, wherein the first copolymer chain comprises a function R1 of the type of primary or secondary amine (R: hydrogen atom, alkyl or aryl) and the second copolymer chain comprises a function R2 selected from the group consisting of an oxirane, a carboxylic acid or its salts, an aldehyde, a ketone, a sulfonic acid or its salts, a phosphonic acid or its salts, a cyclic carbonate, a isocyanate, an isothiocyanate, and an halide (X: Cl, I or Br).

13. The solid polymer electrolyte as defined in claim 6, wherein the identical copolymer chains comprises functions R1 of the type alcohol or its salts; the at least two chemical functions R2 of the small molecule are selected from the group consisting of carboxylic acid or its salts, an isocyanate, a thioisocyanate, an oxirane, an ester, a sulfonic acid or its salts, a phosphonic acid or its salts, a cyclic carbonate, an acid halide (X: Cl, I or Br) and an halide (X: Cl, I or Br).

14. The solid polymer electrolyte as defined in claim 6, wherein the functions R2 of the small molecule are linked together with an R group selected from the group consisting of a linear or cyclic alkyl or aryl or alkyl fluoride, an ether, ester, amide, thioether, tertiary amines, quaternary ammoniums, urethanes, thiourethane, silanes, ethylene glycol, propylene glycol, a low molecular weight poly(ethylene glycol), a low molecular weight poly(propylene glycol) and a mixture thereof.

15. The solid polymer electrolyte as defined in claim 6, wherein the identical copolymer chains comprises functions R1 of the type primary or secondary amine (R: hydrogen atom, alkyl chain, benzene rings); the at least two chemical functions R2 of the small molecule are selected from the group consisting of a carboxylic acid or its salts, an isocyanate, a thioisocyanate, an oxirane, an ester, a sulfonic acid or its salts, a phosphonic acid or its salts, a cyclic carbonate, an acid halide (X: Cl, I or Br), an aldehyde and a ketone.

16. The solid polymer electrolyte as defined in claim 6, wherein the identical copolymer chains comprises functions R1 of the type carboxylic acid or its salts; the at least two chemical functions R2 of the small molecule are selected from the group consisting of an alcohol or its salts, a primary amine and a secondary amine.

17. The solid polymer electrolyte as defined in claim 6, wherein the identical copolymer chains comprises functions R1 of the type sulfonic acid or its salts; the at least two chemical functions R2 of the small molecule are selected from the group consisting of an alcohol or its salts, a primary amine, a secondary amine and an oxirane.

18. The solid polymer electrolyte as defined in claim 6, wherein the identical copolymer chains comprises functions R1 of the type halide; the at least two chemical functions R2 of the small molecule are selected from the group consisting of an alcohol or its salts, and a primary amine.

19. The solid polymer electrolyte as defined in claim 6, wherein the identical copolymer chains comprises functions R1 of the type oxirane; the at least two chemical functions R2 of the small molecule are selected from the group consisting of a phosphonic acid or its salts, a sulfonic acid or its salts, an alcohol or its salts, a primary amine and a secondary amine.

20. The solid polymer electrolyte as defined in claim 6, wherein the identical copolymer chains comprises functions R1 of the type cyclic carbonate, isocyanate or isothiocyanate; the at least two chemical functions R2 of the small molecule are selected from the group consisting of an alcohol or its salts, a primary amine and a secondary amine.

21. The solid polymer electrolyte as defined in claim 6, wherein the identical copolymer chains comprises functions R1 of the type aldehyde or ketone; the at least two chemical functions R2 of the small molecule are a primary amine.

22. The solid polymer electrolyte as defined in claim 6, wherein the identical copolymer chains comprises functions R1 of the type alcohol; the at least two chemical functions R2 of the small molecule are selected from the group consisting of a trichlorosilane, a carboxylic acid or its salts, an acid halide (X: Cl, I or Br) and an halide (X: Cl, I or Br).

23. The solid polymer electrolyte as defined in claim 6, wherein the identical copolymer chains comprises functions R1 of the type azide; the at least two chemical functions R2 of the small molecule are a propargyl.

24. The solid polymer electrolyte as defined in claim 6, wherein the identical copolymer chains comprises functions R1 of the type propargyl protected by a silane or not; the at least two chemical functions R2 of the small molecule are an azide.

25. The solid polymer electrolyte as defined in claim 7, wherein the identical copolymer chains comprises functions R1 of the type thymine, cinnamate, coumarine, or 443'-buten-1'-oxy).

26. A solid polymer electrolyte for a battery, the solid polymer electrolyte including a diblock of the DC type or a triblock copolymer of the DCD type in which block C is an unsubstituted polyethylene oxide chain having a number-average molecular weight less than 80,000 g/mol; block D is an anionic polymer prepared from one or more monomers selected from vinyl monomers and derivatives thereof to which is grafted an anion of lithium salt, the copolymer chains mixed with a cross-linkable polymer having low molecular weight (<20,000 g/mol) of at least one monomer selected from vinyl phenyl substituted in meta, ortho or para, acrylates and methacrylates, acrylamide, methacrylamide allyl, vinyl and compounds having at least one reactive double bond, the cross-linkable polymer being cross-linked to form a cross-linked copolymer network.

27. The solid polymer electrolyte as defined in claim 26, wherein the cross-linkable polymer having low molecular weight (<20,000 g/mol) is a polyoxyethylene glycol diacrylate or dimethacrylate.

28. The solid polymer electrolyte as defined in claim 26, wherein the anion of lithium salt is selected from the group consisting of $LiCF_3SO_3$, $LiB(C_2O_4)_2$, $LiN(CF_3SO_2)_2$, $LiN(FSO_2)_2$, $LiC(CF_3SO_2)_3$, $LiC(CH_3)(CF_3SO_2)_2$, $LiCH(CF_3SO_2)_2$, $LiCH_2(CF_3SO_2)$, $LiC_2F_5SO_3$, $LiN(C_2F_5SO_2)_2$, $LiN(CF_3SO_2)$, $LiB(CF_3SO_2)_2$, $LiPF_6$, $LiSbF_6$, $LiClO_4$, $LiSCN$, $LiAsF_6$, and $LiBF_4$.

29. A battery having a plurality of electrochemical cells, each electrochemical cell including a metallic lithium anode, a cathode, and a solid polymer electrolyte layer, the solid polymer electrolyte layer being a solid polymer electrolyte layer as recited in claim 1.

30. The battery as defined in claim 29, wherein the solid polymer electrolyte layer is pressed against the metallic lithium anode.

* * * * *